United States Patent
Meriwether

(10) Patent No.: US 9,977,788 B2
(45) Date of Patent: May 22, 2018

(54) METHODS AND SYSTEMS FOR MANAGING FILES IN AN ON-DEMAND SYSTEM

(71) Applicant: salesforce.com, inc., San Francisco, CA (US)

(72) Inventor: Andrew Meriwether, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 528 days.

(21) Appl. No.: 14/025,498

(22) Filed: Sep. 12, 2013

(65) Prior Publication Data
US 2014/0082033 A1    Mar. 20, 2014

Related U.S. Application Data

(60) Provisional application No. 61/701,499, filed on Sep. 14, 2012.

(51) Int. Cl.
*G06F 17/30* (2006.01)

(52) U.S. Cl.
CPC .. *G06F 17/30194* (2013.01); *G06F 17/30917* (2013.01); *G06F 17/30067* (2013.01); *G06F 17/30091* (2013.01); *G06F 17/30129* (2013.01); *G06F 17/30182* (2013.01); *G06F 17/30233* (2013.01)

(58) Field of Classification Search
CPC ............. G06F 17/248; G06F 17/30233; G06F 17/30067; G06F 17/30129; G06F 17/30091; G06F 17/3023; G06F 17/3007
USPC .......................... 707/821, 825–827, 822, 609
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

FOREIGN PATENT DOCUMENTS

| | | | | |
|---|---|---|---|---|
| EP | 2 690 563 A1 | * | 1/2014 | ............ G06F 17/30 |
| WO | WO 02/095617 A1 | * | 11/2002 | ............ G06F 17/30 |

OTHER PUBLICATIONS

Authors et al. IBM, A model for representing forms, form fields, form to field relationship and form field aggregation, IBM, Feb. 29, 2006, pp. 1-5.*

*Primary Examiner* — Frantz Coby
(74) *Attorney, Agent, or Firm* — Lorenz & Kopf, LLP

(57) ABSTRACT

Methods and systems are provided for managing files in an on-demand system. One exemplary method involves a server obtaining an input value from a data input field of an electronic file that was generated based on a template that maintains an association between the data input field and a field of an object in a database. The method continues with the server storing the input value in the field of the object in the database based on the association. In one or more embodiments, an input value indicated by a graphical user interface element within an electronic file is mapped to a column of an object table in the database that corresponds to the field of the object associated with the data input field that corresponds to the graphical user interface element.

20 Claims, 7 Drawing Sheets

(56) References Cited

U.S. PATENT DOCUMENTS

| | | |
|---|---|---|
| 5,831,610 A | 11/1998 | Tonelli et al. |
| 5,835,712 A * | 11/1998 | Dufresne .......... G06F 17/30893 707/999.01 |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,151,608 A * | 11/2000 | Abrams ................ G06F 17/303 707/679 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,257,626 B2 * | 8/2007 | Mokuya ............... H04L 41/0226 707/999.001 |
| 7,340,411 B2 | 3/2008 | Cook |
| 7,401,094 B1 | 7/2008 | Kesler |
| 7,412,455 B2 | 8/2008 | Dillon |
| 7,533,118 B2 * | 5/2009 | Chaudri ............. G06F 17/2258 |
| 7,536,378 B2 * | 5/2009 | Kaiser .............. G06F 17/30389 |
| 7,620,655 B2 | 11/2009 | Larsson et al. |
| 7,647,553 B2 * | 1/2010 | Mogilevsky .......... G06F 17/212 715/234 |
| 7,698,160 B2 | 4/2010 | Beaven et al. |
| 7,792,872 B1 * | 9/2010 | Baltazar ............ G06F 17/30011 705/7.27 |
| 7,870,485 B2 * | 1/2011 | Seliutin ............. G06F 17/30011 715/209 |
| 8,032,825 B2 * | 10/2011 | Cross, Jr. .............. G06F 9/4443 715/234 |
| 8,042,146 B2 * | 10/2011 | Ohara ................. G06F 21/6209 726/1 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,352,444 B1 * | 1/2013 | Chang ................ G06F 12/1408 707/693 |
| 8,566,698 B1 * | 10/2013 | Zubizarreta ........... G06F 17/243 715/221 |
| 8,607,139 B2 * | 12/2013 | Alexander ............ G06F 17/218 715/221 |
| 2001/0028363 A1 * | 10/2001 | Nomoto ............ G06F 17/30067 715/748 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0163535 A1 * | 11/2002 | Mitchell ................... G06F 8/38 715/744 |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223347 A1 * | 10/2005 | Okuaki ............................ 716/5 |
| 2005/0278760 A1 * | 12/2005 | Dewar ............... H04N 7/17336 725/94 |
| 2006/0106763 A1 * | 5/2006 | Dirisala ............ G06F 17/30398 |
| 2006/0230083 A1 * | 10/2006 | Allyn .................... G06F 11/3684 |
| 2006/0259527 A1 * | 11/2006 | Devarakonda .... G06F 17/30144 |
| 2007/0136292 A1 * | 6/2007 | Ohara ................. G06F 21/6209 |
| 2008/0016047 A1 * | 1/2008 | Dettinger .......... G06F 17/30545 |
| 2008/0028301 A1 * | 1/2008 | Look .................... G06F 17/5004 715/255 |
| 2008/0249972 A1 | 10/2008 | Dillon |
| 2009/0063414 A1 | 3/2009 | White et al. |
| 2009/0183117 A1 * | 7/2009 | Chang .......................... 715/810 |
| 2010/0251092 A1 * | 9/2010 | Sun ...................... G06F 17/243 715/222 |

(56) References Cited

U.S. PATENT DOCUMENTS

2011/0066668 A1* 3/2011 Guarraci .......... G06F 17/30233
707/831
2011/0078085 A1 3/2011 Clement
2012/0131445 A1* 5/2012 Oyarzabal ............ G06F 17/211
715/235
2013/0097485 A1* 4/2013 Oyarzabal ............ G06F 17/211
715/235

* cited by examiner

METHODS AND SYSTEMS FOR MANAGING FILES IN AN ON-DEMAND SYSTEM

CROSS-REFERENCE TO RELATED APPLICATION(S)

This application claims the benefit of U.S. provisional patent application Ser. No. 61/701,499, filed Sep. 14, 2012, the entire content of which is incorporated by reference herein.

TECHNICAL FIELD

Embodiments of the subject matter described herein relate generally to computer systems, and more particularly, to methods and systems for managing data input to electronic files in an on-demand computing system.

BACKGROUND

Document intensive business processes have traditionally been a fixture in many different industries. For example, document forms are routinely exchanged among various business partners, clients, customers, suppliers, and the like, with recipients manually adding information to complete the document forms before returning them to the original sender or another third party. Upon receipt of the completed document forms, another individual often reviews the completed document forms to glean the information added to the document form by the original recipient for manual entry into a computing system or use in another business process. While computing systems have been developed to improve collaboration, integration, and cooperation within or among organizations, readily integrating document intensive business processes with these systems in a manner that leverages the full capabilities of such systems has proven to be challenging.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
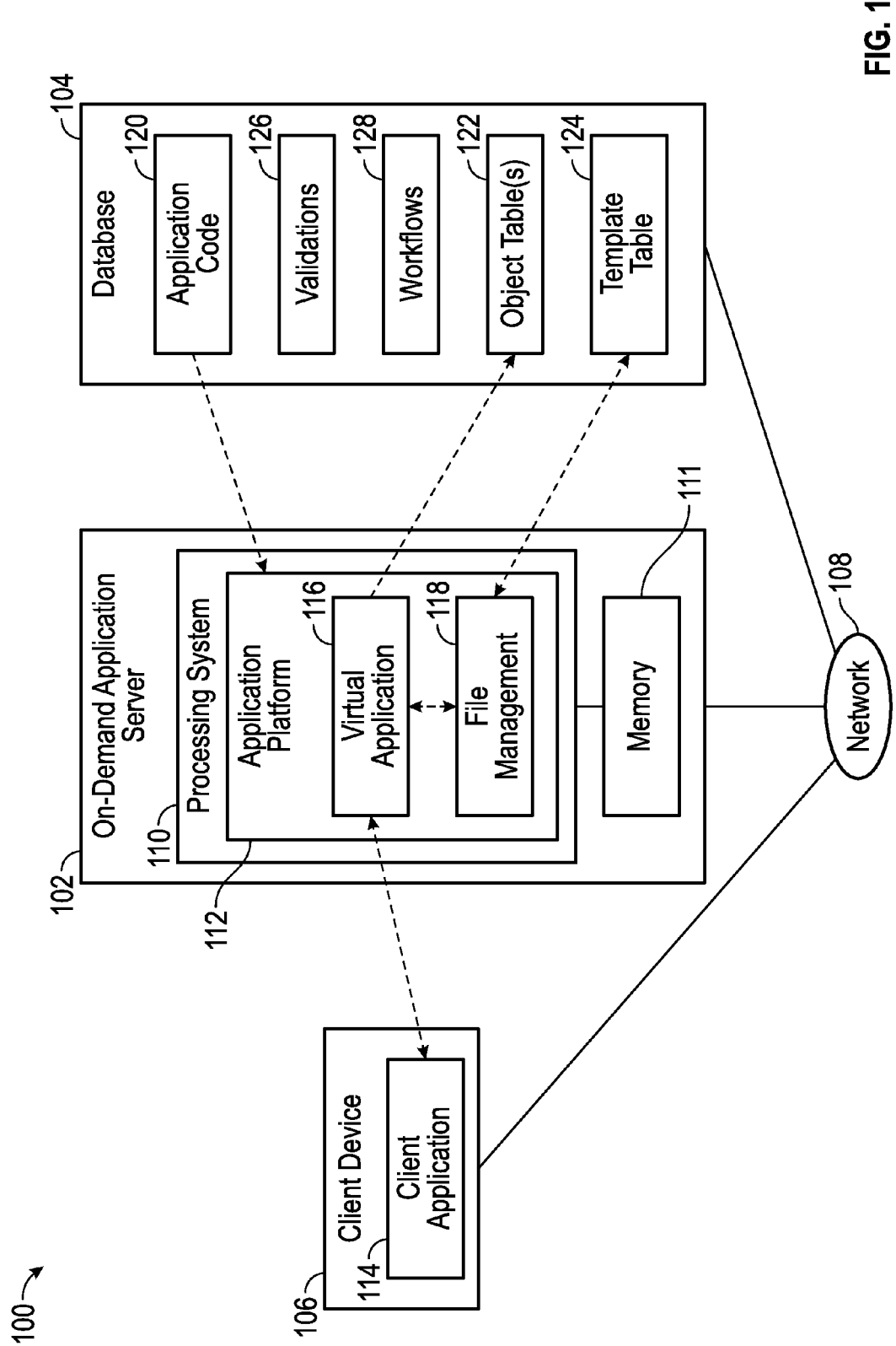
FIG. 1 is a block diagram of an exemplary on-demand application system.

Embodiments of the subject matter described herein generally relate to managing data values input into electronic files that are submitted or otherwise provided to an on-demand system that includes a server and a database. As described in greater detail below, the electronic files are generated in a particular file format using a template maintained in a database of the on-demand system, and the template maintains or otherwise defines an association between a data input field (or data entry field) within an electronic file generated using the template and a particular field of a database object to which that data input field corresponds. After a user inputs data values into the data input fields of the generated electronic file and initiates submission of the input data values and/or the completed electronic file back to the on-demand system, the server utilizes the association between a respective data input field and a respective database object field to store the raw input data value obtained from that data input field to the appropriate field (or column) of a database object table in the database that corresponds to the particular field of the particular database object to which that respective data input field is associated with. In this regard, the raw input data value stored in the database object field is unformatted and/or unencoded and does not include any markup tags. In this manner, the on-demand system may store or otherwise maintain the input data values from data input fields within an electronic file in lieu of storing or otherwise maintaining an instance of the electronic file. Furthermore, by virtue of the input data values being unformatted and/or unencoded in the database object tables, they may be seamlessly integrated with other features and/or functionality of the on-demand system, such as, for example, automated validation and/or workflow rules, generating reports and/or user notifications, and the like. For purposes of explanation, the subject matter may be described herein in the context of electronic document files, however, the subject matter is not limited to electronic document files and may be employed in an equivalent manner for other types of electronic files (e.g., spreadsheet files, and the like).

In one or more embodiments, the template stores or otherwise maintains, in association with a data input field, a reference to the particular column of the database object table associated with the type of database object to be associated with the input value in a data input field. After obtaining an input data value from the data input field, the server utilizes a markup tag, instructions and/or other annotating code associated with the data input field to store that input data value in that particular column of that database object table. In some embodiments, the server may receive the input data value from a data input field and the annotation(s) associated with that data input field directly from the electronic file via a web service communications session over a network that is initiated from within the electronic file on a client device, and thereafter utilize the annotation(s) (e.g., tags, instructions, and/or other markups) on the input data value automatically in response to receiving the input data value and the associated annotation(s) via the web service communications session. In other embodiments, the server may receive the completed electronic file in its particular file format from a client device via a network, and thereafter obtain the input data value by parsing or otherwise analyzing the electronic file to identify the data input field and the input data value contained therein. When the annotation(s) associated with the data input field is embedded within the electronic file, the server may obtain the annotation(s) by parsing or otherwise analyzing the electronic file. Otherwise, the server identifies or otherwise determines the template associated with the electronic file and obtains the annotation(s) associated with the data input field from the identified template maintained by the database. As described above, in response to obtaining the input data value from a data input field and the annotation(s) associated with the data input field, the server may automatically execute or otherwise perform the operation(s) indicated by the annotation(s) on the input data value to store the input data value at the appropriate location in the database. Thereafter, in one or more embodiments, the server discards or otherwise deletes the electronic file rather than storing the electronic file in the database.

In some embodiments, prior to storing an input data value from a data input field within an electronic file in the database, the server may automatically apply one or more validation rules to the input data value before storing the input data value in the database. In this regard, a validation rule includes validation criteria for a particular field (or column) of a particular database object, such as, for example, a listing of acceptable values, a range of acceptable values, and/or other restrictions for that particular database object field. Thus, if the input data value obtained from a data input field does not satisfy the validation criteria for the particular field of the particular database object associated with the data input field, the server may fail to store the input data value in the database and/or apply a default value to that particular field of the particular database object. In some embodiments, then the input data value and the annotation(s) are received via a web service communications session, the server may utilize the annotation(s) to identify the destination database object table, obtain the validation criteria associated with the destination column in that database object table that are stored by the database, and automatically generate a notification or indication of an invalid input data value when the input data value does not satisfy the validation criteria for that particular data entry field and provide the notification to the client device via a network. Similarly, in embodiments where the server received the electronic file from a client device, the server may utilize the annotation(s) associated with an input data value to identify the destination database object table, obtain the validation criteria associated with the destination column in that database object table that are stored by the database, and return the electronic file to the client device with a notification or indication of the invalid input data value for that particular data input field. In some embodiments, the validation rules may be integrated or otherwise embedded in the electronic file by including the appropriate markup tags, instructions, or the like in association with the data input field. Accordingly, depending on the type of electronic file format being utilized, the integrated and/or embedded validation rules may be utilized to notify and/or prevent the user from entering and/or submitting invalid data values to the server.

In exemplary embodiments, after storing the input data values from the data input fields within an electronic file in the database, the on-demand system automatically processes the input values, for example, by automatically applying one or more workflow rules or the like to the input data values. In this regard, a workflow rule specifies one or more additional actions that should be undertaken with respect to an input data value and/or in response to an input data value based on one or more triggering criteria for that particular database object field. For example, a workflow rule may specify that a notification be provided to a particular user when the input data value for a particular column (or field) of a database object is equal to a particular value or within a specified range of values. Accordingly, when the input data value obtained from a data input field within an electronic file satisfies the notification criteria defined by a particular workflow rule, the server may automatically generate or otherwise provide a notification to that particular user (e.g., via an email, a text message, a data feed, a web feed, or the like) in response to storing the input data value in the database. As another example, a workflow rule may specify that a report be generated when the input data value for a particular column (or field) of a database object is equal to a particular value or within a specified range of values, wherein the server automatically generates a new report (or updates an existing report) that reflects the input data value in response to storing the input data value in the database.

Turning now to FIG. 1, an exemplary on-demand application system 100 includes an application server 102 that includes or otherwise implements an application platform 112 capable of generating one or more instances of a virtual application 116 at run-time (e.g., or "on-demand") based upon data stored or otherwise maintained by a database 104 that is communicatively coupled to the application server 102 via a communications network 108, such as a wired and/or wireless computer network, a cellular network, a mobile broadband network, a radio network, or the like. In this regard, the application server 102 and the database 104 cooperatively provide a cloud computing platform (or framework). In accordance with one or more embodiments, the database 104 is realized as a multi-tenant database that is shared between multiple tenants, that is, the database 104 may store or otherwise maintain data associated with a number of different tenants and restrict accessibility of one tenant's data with respect to other tenants' data, as described in greater detail below in the context of FIG. 7.

In the illustrated embodiment of FIG. 1, the application server 102 generally represents a computing system or another combination of processing logic, circuitry, hardware, and/or other components configured to support the file management processes and the related tasks, operations, and/or functions described herein. In this regard, the application server 102 includes a processing system 110, which may be implemented using any suitable processing system and/or devices, such as one or more processors, central processing units (CPUs), controllers, microprocessors, microcontrollers, processing cores and/or other computing resources configured to support the operation of the processing system 110 described herein. The processing system 110 may include or otherwise access a data storage element 111 (or memory) (e.g., random access memory (RAM), read only memory (ROM), flash memory, magnetic or optical mass storage, or any other suitable non-transitory short or long term data storage or other computer-readable media) capable of storing programming instructions for execution by the processing system 110, that, when read and executed, cause processing system 110 to create, generate, or otherwise facilitate the application platform 112 that generates or otherwise provides the virtual application 116 at run-time (or "on-demand") based upon data and/or code 120 that is stored or otherwise maintained by the database 104.

In exemplary embodiments, an instance of the virtual application 116 is provided to a client device 106 that is communicatively coupled to the application server 102 via a communications network, such as network 108. In this regard, the client device 106 generally represents an electronic device coupled to the network 108 that is utilized by a user to access the application platform 112 and/or virtual application 116 on the application server 102. In practice, the client device 106 can be realized as any sort of personal computer, mobile telephone, tablet or other network-enabled electronic device that includes a display device, such as a monitor, screen, or another conventional electronic display, capable of graphically presenting data and/or information provided by the application platform 112 and/or the virtual application 116 along with a user input device, such as a keyboard, a mouse, a touchscreen, or the like, capable of receiving input data and/or other information from the user of the client device 106. It should be noted that although FIG. 1 depicts the client device 106 communicating on the same network 108 that the application server 102 and the database 104 communicate on for purposes of explanation, in practice, the client device 106 and the application server 102 may communicate via a communications network that is separate and/or distinct from the network 108. For example, the client device 106 could communicate with the application server 102 via a cellular network or the Internet, while the application server 102 communicates with the database 104 via a local area network (LAN).

A user may manipulate the client device 106 to execute a client application 114, such as a web browser application, and contact the application server 102 and/or application platform 112 using a networking protocol, such as the hypertext transport protocol (HTTP) or the like. In response, in exemplary embodiments, the application server 102 and/or application platform 112 accesses the database 104 to obtain or otherwise retrieve application code 120, which includes computer-executable code segments, instructions, scripts or the like that are executed by the processing system 110 and/or application platform 112 to generate the virtual application 116. The application platform 112 authenticates or otherwise identifies the user and generates the virtual application 116 at run-time based upon information and/or data associated with the user and/or the user's associated tenant that is maintained by the database 104. In this regard, the virtual application 116 may include code, data and/or other dynamic web content provided to the client device 106 that is parsed, executed or otherwise presented by the client application 114 running on the client device 106.

The virtual application 116 typically includes one or more graphical user interface (GUI) displays generated by the application server 102 based on data obtained from the database 104. For example, the GUI displays may pertain to the database objects associated with or otherwise belonging to a particular tenant (or organization) supported by the database 104, and the GUI displays may include GUI elements or widgets that allow the user of the client device 106 to select or otherwise identify the database object(s) of interest to the user (e.g., a particular account, opportunity, contact, or the like in the case of a CRM application) along with GUI elements or widgets that allow the user to initiate or otherwise perform various activities with respect to a selected database object.

In the illustrated embodiment of FIG. 1, the file management engine 118 generally represents a software module or another feature that is generated or otherwise implemented by the application platform 112 to facilitate the creation of file templates for one or more electronic files, store or otherwise maintain the file templates in the database 104, and generate one or more electronic files using the file templates. For example, as described in greater detail below, the file management engine 118 and the virtual application 116 are cooperatively configured to generate or otherwise provide one or more GUI displays within the client application 114 on the client device 106 that allow the user to define a new file template (or alternatively, modify an existing file template) and create, add, or otherwise insert various fields and/or GUI elements in the template, which may or may not be populated using data maintained in one or more object tables 122 in the database 104. In exemplary embodiments, the GUI displays enable a user to create, add, or otherwise insert one or more data input fields in the template and create or otherwise define an association between a respective data input field and a particular field of a particular object in the database 104. For example, within a file template for an electronic document file, the user may add, create, or otherwise define a data input field and manipulate GUI elements of the GUI display to associate that data input field with the name field of an account object in the database 104 (e.g., the name field or column in the object table 122 associated with account objects). It should be noted that although FIG. 1 depicts the file management engine 118 as being separated from the virtual application 116, in practice, the features and/or functionality of the file management engine 118 may integrated into or otherwise implemented by the virtual application 116.

As described in greater detail below in the context of FIGS. 2-6, in response to receiving an indication to generate an electronic file using a particular template, the file management engine 118 obtains the identified template from the database 104 and utilizes the obtained template to generate the electronic file by referencing the associated database objects in the object tables 122 to populate various fields of the electronic file and arranging the fields within the electronic file in the order or manner prescribed by the template. In exemplary embodiments, after generating the electronic file, the server 102 transmits or otherwise provides the generated electronic file to an intended user or destination device via the network 108. Thereafter, the user may open or otherwise access the generated electronic file on a client device 106, manipulate the data input fields to provide input data values, and transmit, submit, or otherwise provide the completed electronic file and/or the input data values back to the server 102 via the network 108.

The server 102 utilizes the association between the data input fields and the database object fields defined by the template to store or otherwise maintain the input data value within a respective data input field of an electronic file in the appropriate field (or column) of data in the object table 122 in the database 104 that is associated with or otherwise corresponds to the database object associated with that respective data input field. For example, if the template includes markup tags or other annotation instructions that associate a data input field of an electronic file with the name field of an account object, the server 102 utilizes the markup tags to store the raw input data value within that data input field in the name field (or column) of data in the object table 122 that is associated with account objects. In this manner, input data values that are input into or otherwise contained within the electronic file are transferred or otherwise translated to the database object tables 122 in a manner that allows the input data values to be automatically processed by the server 102. For example, the database 104 may include a workflow table 128 that includes one or more workflow rules that may be automatically applied to an input data value by the server 102 and/or the virtual application 116 after storing the input data value to an object table 122 in the database 104 to automatically generate notifications, reports, or the like that are based on or otherwise influenced by the input data value in response to receiving the input data value. Additionally, the database 104 may include a validation table 126 that includes one or more validation rules that may be automatically applied by the server 102 and/or the virtual application 116 before storing an input data value to an object table 122 in the database 104. Accordingly, input data values provided in an electronic file may be processed by the on-demand application system 100 in an automated manner in accordance with the various rules and/or business processes established by the particular tenant the electronic file is associated with. For example, an employee or associate of that tenant does not need to manually review and validate input data in the electronic files and then manually input the data gleaned from the electronic files into the database 104.

Figure 2:
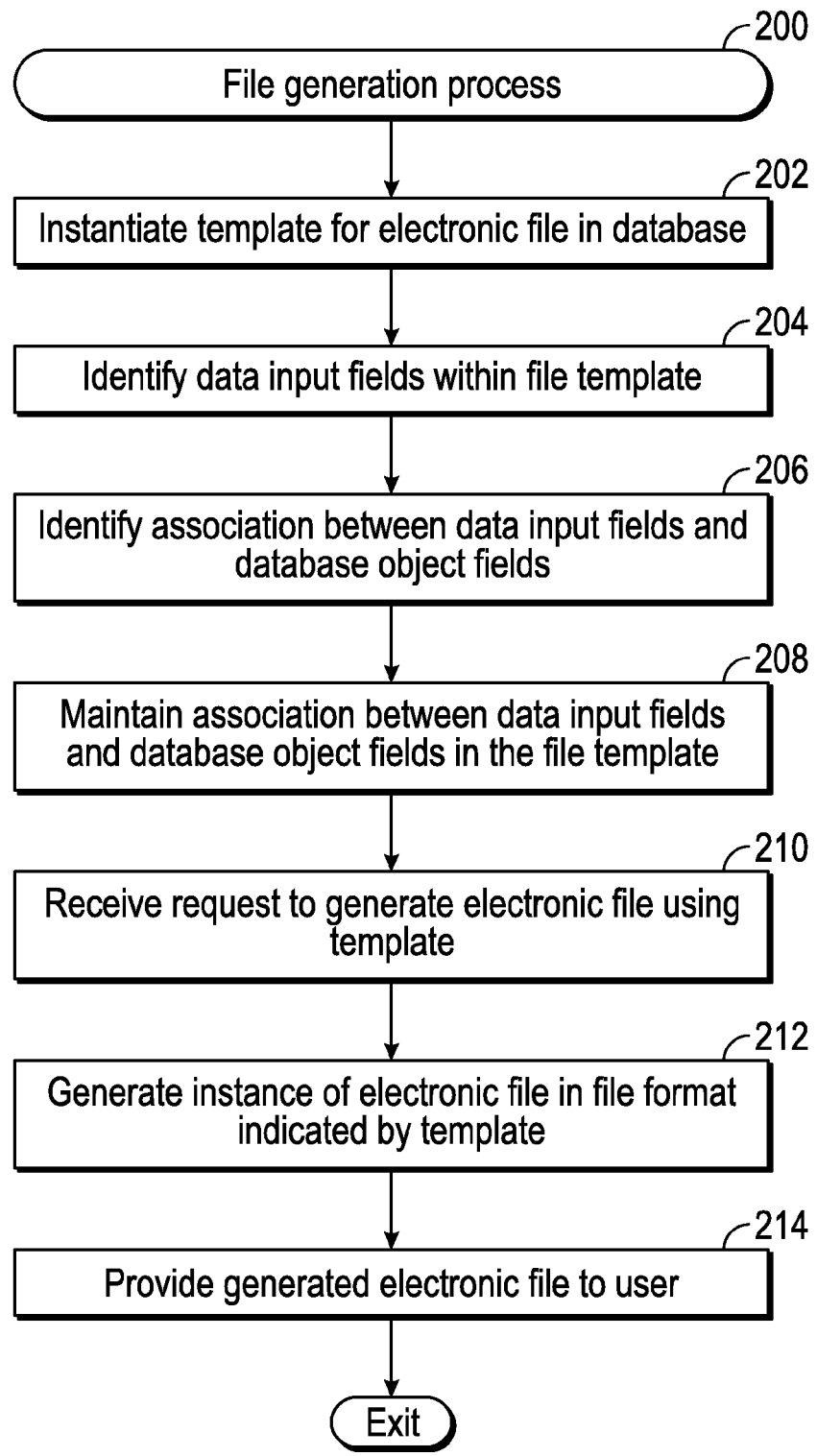
FIG. 2 is a flow diagram of an exemplary file generation process suitable for implementation by the on-demand application system of FIG. 1 in accordance with one or more embodiments.

FIG. 2 depicts an exemplary embodiment of a file generation process 200 suitable for implementation by an on-demand application system to generate electronic files having data input fields associated with database object fields. The various tasks performed in connection with the illustrated file generation process 200 may be performed by hardware, suitably configured analog circuitry, software executed by processing circuitry, firmware executable by processing circuitry, or any combination thereof. For illustrative purposes, the following description may refer to elements mentioned above in connection with FIG. 1. In practice, portions of the file generation process 200 may be performed by different elements of the on-demand application system 100, such as, for example, the application server 102, the database 104, the processing system 110, the application platform 112, the virtual application 116, the file management engine 118 and/or the application code 120. It should be appreciated that the file generation process 200 may include any number of additional or alternative tasks, the tasks need not be performed in the illustrated order and/or the tasks may be performed concurrently, and/or the file generation process 200 may be incorporated into a more comprehensive procedure or process having additional functionality not described in detail herein. Moreover, one or more of the tasks shown and described in the context of FIG. 2 could be omitted from a practical embodiment of the file generation process 200 as long as the intended overall functionality remains intact.

Referring now to FIGS. 1-2, in an exemplary embodiment, the illustrated file generation process 200 is initiated by a user of a client device 106 manipulating one or more GUI elements (e.g., a button or the like) within the virtual application 116 to select or otherwise indicate a desire to create a new file template in the database 104. For example, the user of the client device 106 may provide a name and/or other identifying information that the user would like to assign the new file template within a text box presented within the virtual application 116 and select a button to initiate creation of the new template in the database 104.

In response to receiving an instruction or a command to create a new file template, the file generation process 200 continues by creating or otherwise instantiating a new template for an electronic file in the database 104 (task 202). In this regard, the application server 102 and/or file management engine 118 creates a new template file in the database 104 having the file format selected or otherwise identified by the along with a new entry (or record or row) in the template table 124 in the database 104 using name and/or other identification information received from a user of a client device 106 that may be utilized to locate the corresponding template file in the database 104. As described above, the virtual application 116 and/or the file management engine 118 may be cooperatively configured to generate or otherwise provide a GUI display within the client application 114 on the client device 106 that includes GUI elements adapted to allow a user to provide a name and/or other identification information that the user would like to assign to a new template, select or otherwise designate a file format that the user would like to utilize for electronic files generated using the new template, and submit a request or otherwise indicate a desire to create the template. In response to receiving a request to create a new template from the client application 114, the virtual application 116 and/or file management engine 118 obtains the name and/or other identification information provided by the user that accompanies the request and automatically creates or otherwise instantiates the new template file in the database 104 along with a corresponding entry for the new template in the template table 124. In this regard, the new template entry in the template table 124 includes or is otherwise associated with the name and/or other identification information provided by the user. In exemplary embodiments, the virtual application 116 and/or the file management engine 118 also generates a unique identifier that is associated with the entry in the template table 124 and the corresponding template file in the database 104. Additionally, in a multi-tenant implementation, the template entry and/or the template file for a tenant-specific template may also include or otherwise be associated with the unique identifier assigned to the tenant (or organization) that the user of the client device 106 is associated with (e.g., the orgID for the user's associated tenant).

As described in greater detail below in the context of FIGS. 5-6, in one or more embodiments, after receiving the request to create a template and instantiating the template in the database 104, the virtual application 116 and/or the file management engine 118 are cooperatively configured to generate or otherwise provide a template editor GUI display within the client application 114 on the client device 106 that allows the user to define the layout or structure for the electronic file along with the content of the electronic file. For example, the template editor GUI display may also include GUI elements capable of being manipulated by the user to add text and/or other GUI elements to the body of the electronic file. In various embodiments, the user may define static text and/or values for the body of the electronic file and/or configure portions of the body of the electronic file to be populated automatically by the server 102 using data maintained by the database 104 upon generation of an electronic file using the template.

Still referring to FIGS. 1-2, the file generation process 200 continues by identifying any data input fields inserted or otherwise created within the template, identifying associations between the respective data input fields and corresponding database object fields, and maintaining the associations between the respective data input fields and the respective database object fields associated therewith in the template (tasks 204, 206, 208). In one or more exemplary embodiments, a user adds one or more GUI elements to the body of template that are capable of being manipulated within the resultant electronic file by recipients of the electronic file to capture or otherwise receive input data values provided by those recipients. For example, the user may select an electronic document file format when creating a template for an electronic document survey form and add input GUI elements (e.g., text boxes, check boxes, radio buttons, menus, or the like) for receiving feedback from recipients of the survey form in the body of the electronic document template. Upon insertion of an input GUI element into the template, the user creating the template designates or otherwise provides an indication of the particular field of data associated with a particular database object maintained in or otherwise supported by the object tables 122 that user would like to associate with the input value received via that input GUI element. For example, a user may insert a text box for receiving a recipient's preferred contact phone number in the body of the template for the electronic document survey form, and manipulate one or more GUI elements within the GUI display to identify or otherwise indicate that the text box should be associated with the contact phone number field of a contact database object in the database 104 that is associated with the recipient.

In other embodiments, the input GUI elements may automatically be determined based on various criteria associated with the associated database object field. For example, the destination database object table 122 may be associated with various display criteria and/or rules that designate the destination column of the database object table 122 as potentially containing a range of numerical values that should be captured and/or presented in a text box, while another column of the database object table 122 may be designated as potentially containing a limited set of possible values that can be captured and/or presented in a drop-down menu. In this regard, as described in greater detail below in the context of FIGS. 5-6, the user may manipulate the GUI elements in the GUI display to define the database object field for which a data input field is desired in a manner that allows the virtual application 116 to automatically determine the appropriate input GUI element for that destination database object field based on the display criteria and/or rules associated with that destination field (or column) in the destination database object table 122.

After receiving an indication of a database object field to be associated with a data input field in the electronic file, the server 102 and/or the file management engine 118 maintains the association between the data input field and the database object field in the template file using one or more markup tags and/or other annotation(s). For example, in response to receiving an indication that a text box in the template for an electronic document survey form should be associated with the contact phone number field of a contact database object in the object tables 122, the server 102 and/or the file management engine 118 modifies or otherwise updates the template file to identify that the column for the contact phone number field in the contact object table 122 is associated with the text box. In one embodiment, the server 102 and/or the file management engine 118 encodes or otherwise marks up reference to the contact phone number field in the template file with the appropriate markup tags and/or instructions for generating a text box.

In some embodiments, in response to receiving the indication of the particular associated database object field to be associated with a data input field, the server 102 and/or the file management engine 118 automatically generates a marked up reference to that particular field of the object table 122 associated with that particular type of database object and stores that marked up reference in the template file. In this regard, the marked up reference of the destination database object field is marked up to designate or otherwise define a data input field is associated with the destination database object field, and thereby maintains the association between the corresponding input GUI elements in electronic files generated using the template and the destination database object field. For example, in response to receiving an indication that a text box should be associated with the contact phone number field of a contact database object, the server 102 and/or the file management engine 118 may automatically generate a marked up reference to the contact phone number field in the contact object table 122 (e.g., "<input {!Contact.ContactPhoneNumber}\input>") to indicate the resulting data input field corresponds to the contact phone number field and stores that marked up reference to the contact object table 122 in the template in response to a user adding to the marked up reference to the body of the template and saving the template to the database 104.

In exemplary embodiments, for each data input field inserted within the body of a template, the template file maintains the association between that data input field and the identified field in the object table 122 for the identified database object. In this manner, the user of a client device 106 may manipulate GUI elements within a GUI display generated or otherwise provided by the virtual application 116 and/or the file management engine 118 to create or otherwise define a template for an electronic file that includes any number of data input GUI elements associated with any number of database object fields.

After definition of the template is completed, the illustrated file generation process 200 continues by receiving a request to generate an instance of an electronic file using the template, generating the instance of the electronic file in response to receiving the request, and transmitting or otherwise providing the generated electronic file to the desired user (tasks 210, 212, 214). In one or more embodiments, a user of a client device 106 transmits or otherwise provides, to the server 102 and/or the file management engine 118 via the network 108, a request or indication of a desire to generate an electronic file using a particular template. The request received by the server 102 and/or the file management engine 118 may also include additional data and/or information provided by the user of the client device 106 that is utilized by the server 102 and/or the file management engine 118 to generate the electronic file. For example, a user of the client device 106 may manipulate the virtual application 116 to request for an electronic document survey form to be sent to a particular contact by selecting the electronic document survey form from a list of templates available to the user and inputting or otherwise providing the contact's name or some other unique identifier associated with the contact. In response to the request, the virtual application 116 and/or file management engine 118 accesses the template table 124 to obtain or otherwise select the template entry for the electronic document survey form, locate that template file in the database 104, and then use the contact's name and/or other information provided by the user to populate various fields of the electronic document survey form before generating the survey form in the appropriate electronic document file format indicated by the template file.

After generating the electronic document file, the server 102 and/or the file management engine 118 may transmit or otherwise provide the generated electronic document file to the identified contact, for example, via email or another electronic communication over the network 108. Thereafter, that recipient of the survey form may access or otherwise open the electronic document file, for example, within a client application 114 on that user's instance of client device 106. Upon reviewing the electronic document file, the user may manipulate the client application 114 to input or otherwise provide data values into the data input GUI elements within the electronic document file and thereby complete the electronic document survey form. It should be noted that once the client device 106 has received the electronic document file, the client device 106 does not need to be connected to the network 108 for the user to continue accessing the electronic document file. In this regard, the user may complete the electronic survey form and save the electronic document file to the client device 106 for later submission once the client device 106 has access to the network 108.

In one or more embodiments, after the user has completed the electronic document survey form, the user may submit, transmit, or otherwise provide the completed electronic document file back to the server 102 and/or the file management engine 118, either directly (e.g., via a reply email) or indirectly (e.g., by emailing the completed electronic document file to the user who requested the electronic document survey form, who, in turn, submits or otherwise provides the electronic document file to the server 102 and/or the file management engine 118). In other embodiments, the electronic document file may include a GUI element configured to initiate a web service request (or call) to the server 102 and/or the file management engine 118 (e.g., a 'Submit' button) that is selected by the user upon completion of the survey form, wherein an acceptance of the web service request by the server 102 and/or the file management engine 118 establishes a web service communications session with the client device 106 that is utilized by the client device 106 to automatically transmit or otherwise upload the input data values captured within the data input fields directly to the server 102 and/or the file management engine 118 via the network 108.

Figure 3:
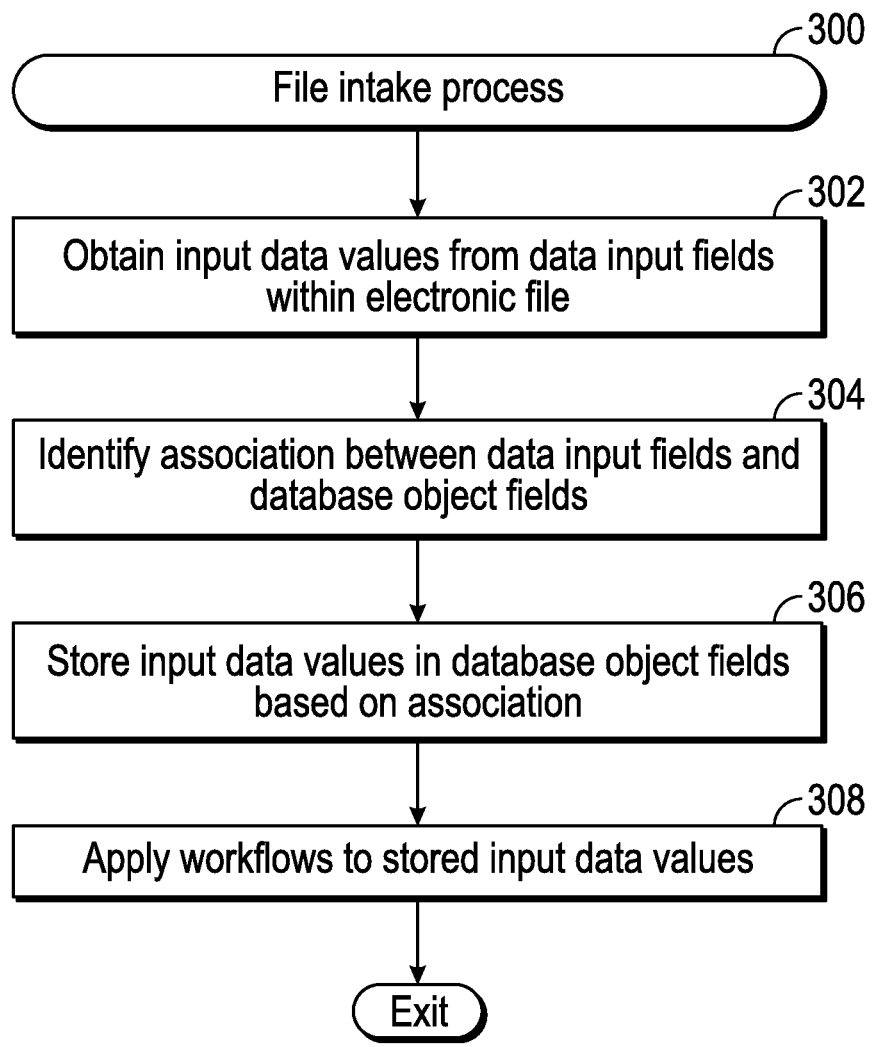
FIG. 3 is a flow diagram of an exemplary file intake process suitable for implementation by the on-demand application system of FIG. 1 in accordance with one or more embodiments.

FIG. 3 depicts an exemplary embodiment of a file intake process 300 suitable for implementation by an on-demand application system to translate input data values from data input fields within electronic files to database object fields. The various tasks performed in connection with the illustrated process 300 may be performed by hardware, suitably configured analog circuitry, software executed by processing circuitry, firmware executable by processing circuitry, or any combination thereof. For illustrative purposes, the following description may refer to elements mentioned above in connection with FIG. 1. In practice, portions of the file intake process 300 may be performed by different elements of the on-demand application system 100, such as, for example, the application server 102, the database 104, the processing system 110, the application platform 112, the virtual application 116, the file management engine 118 and/or the application code 120. It should be appreciated that the file intake process 300 may include any number of additional or alternative tasks, the tasks need not be performed in the illustrated order and/or the tasks may be performed concurrently, and/or the file intake process 300 may be incorporated into a more comprehensive procedure or process having additional functionality not described in detail herein. Moreover, one or more of the tasks shown and described in the context of FIG. 3 could be omitted from a practical embodiment of the file intake process 300 as long as the intended overall functionality remains intact.

In exemplary embodiments, the file intake process 300 begins by receiving or otherwise obtaining input data values from data input fields within an electronic file that is submitted or otherwise provided to a server (task 302). In some embodiments, the server 102 and/or the file management engine 118 receive or otherwise obtain a submitted electronic file from a client device 106 via the network 108 and parse or otherwise analyze the submitted electronic file to identify the input data values within data input fields of the electronic file. For example, after using the client device 106 to manipulate data entry GUI elements within an electronic document file to input data values for those fields, the user may manipulate the client application 114 submit, transmit, or otherwise provide the completed electronic document file back to the server 102 and/or the file management engine 118. In response to receiving the electronic document file, the file management engine 118 may parse or otherwise analyze the electronic document file to obtain the received input data values for the data input fields from the electronic document file. In other embodiments, the server 102 and/or the file management engine 118 receives the input data values within data input fields of the electronic file directly via a web service communications session. For example, the user may manipulate a GUI element for submitting a completed electronic document file back to the server 102, wherein in response to the submit GUI element being manipulated, the client application 114 contacts the file management engine 118 via a web service call over the network 108 to establish a communication session with the file management engine 118 and transmit or otherwise upload the input data values from the data input fields directly to the file management engine 118.

After obtaining the input data values from the data input fields within a submitted electronic file, the file intake process 300 continues by identifying or otherwise determining the association between the respective input data values and respective database object fields and storing or otherwise maintaining the input data values from the data input fields in their respective associated database object fields (tasks 304, 306). In this regard, for each data input field having an associated input data value, the server 102 and/or the file management engine 118 determines which particular field of a particular database object that input data value corresponds to and then stores the input data value in the appropriate column (or field) of the object table 122 corresponding to that database object field for that particular database object. For example, using the reference to a particular field of a particular database object that is marked up or otherwise associated with the annotations for the data input field, the server 102 and/or the file management engine 118 may utilize the reference to identify the appropriate destination database object table 122 and store the input data value in that particular field of the database object. In this manner, the input data values from the data input fields are translated from the electronic file to fields (or columns) of one or more records in the database 104. In some embodiments, the server 102 and/or the file management engine 118 may create a new row (or entry) in the object table 122 before storing or otherwise maintaining the input data value(s) in the object table 122. For example, when the received input data values and/or electronic file corresponds to a recently submitted electronic document survey form, the server 102 and/or the file management engine 118 may create a new row (or entry) in an object table 122 corresponding to survey response objects, thereby instantiating a new record for the recently received survey response in the database 104 before storing the input data value(s) from the survey response in the appropriate columns of the survey response object table 122 within that row. In other embodiments, the server 102 and/or the file management engine 118 may overwrite existing values in the columns of an existing entry in an object table 122 with the received input data values.

In some embodiments where the server 102 and/or the file management engine 118 receives the electronic file, the server 102 and/or the file management engine 118 identifies or otherwise determines the stored template in the database 104 that corresponds to the submitted electronic file, and then parse the obtained template to determine the association between the respective input data values and respective database object fields. For example, the electronic file generated by the server 102 and/or the file management engine 118 may include metadata (e.g., the name and/or other identification information assigned to the template) that can be utilized by the server 102 and/or the file management engine 118 to identify the template that the electronic file is associated with. In response to receiving an electronic file for submission, the server 102 and/or the file management engine 118 parses or otherwise analyzes the metadata associated with the received electronic file to obtain the information identifying its associated template, and then utilizes that identifying metadata to identify or otherwise obtain the template file in the database 104 (e.g., by querying the template table 124 using the identifying metadata identify the entry that maintains the location of the template file in the database 104) that corresponds to the received electronic file. Thereafter, the server 102 and/or the file management engine 118 may parse or otherwise analyze the template file to identify the various data input fields within the electronic document and their associated database object fields and store the input data values from the data input fields in the fields (or columns) of the object tables 122 referenced by the template file.

In other embodiments, the association between the respective input data values and respective database object fields may be identified by the electronic file received by the server 102 and/or the file management engine 118. For example, the markup tags and/or other annotations associated with a particular data input field may be associated with the destination database object field and embedded within the electronic file upon generation of the electronic file, wherein the server 102 and/or the file management engine 118 identifies the marked up destination database object field by parsing or otherwise analyzing the electronic file to identify the database object field referenced by the markup tags for the data input field from which an input data value is obtained. Thereafter, the server 102 and/or the file management engine 118 utilizes the reference to the database object table associated with the markup tags for the data input field to store the input data value from that data input field in the referenced field (or column) of the object table 122.

In other embodiments, when the server 102 and/or the file management engine 118 receives the input data values via a web service communications session, the client device 106 and/or the client application 114 may obtain the identifying metadata from the electronic file and include the identifying metadata in the web service request transmitted to the file management engine 118, which, in turn allows the server 102 and/or the file management engine 118 to identify the stored template in the database 104 that corresponds to the submitted input data values and utilize the identified template file to determine the association between the respective input data values and respective database object fields. In other embodiments, when the reference to the destination database object field associated with the markup tags and/or annotations for a particular data input field is embedded within the electronic document, the client device 106 and/or the client application 114 may obtain the marked up destination database object field associated with the data input field from the electronic file and transmit or otherwise provide the reference to the destination database object field to the file management engine 118 via the web service communications session along with the input data value from that data input field.

As described above, in some embodiments, prior to storing an input data value from an electronic file to a field of an object table 122 in the database 104, the server 102 and/or the virtual application 116 obtains one or more validation rules from the validation table 126 that are applicable to that object table 122 and apply those validation rules to the input data value to ensure the input data value is equal to one of a particular set of values or within a particular range of values for that field of the object table 122. For example, the server 102 and/or the virtual application 116 may apply a validation rule to ensure that an input value to be stored in a phone number field in a contact object table 122 includes ten digits. When the input data value satisfies all applicable validation rules, the server 102 and/or the virtual application 116 stores the input data value in the destination field of the destination object table 122. As described above, in some embodiments, when the input data value does not satisfy all applicable validation rules, the server 102 and/or the virtual application 116 may automatically generate a notification or indication of an invalid input data value for that particular data entry field and provide the notification to a client device 106 and/or a client application 114 via a network 108. It should be noted that in some embodiments, the validation rules may be tenant-specific, wherein the server 102 and/or the virtual application 116 utilizes the tenant identifier associated with the file template and/or the electronic file to obtain that tenant's validation rules from the validation table 126 that are applicable to the destination object table 122.

Still referring to FIG. 3, in exemplary embodiments, after storing the raw input data values to the database, the file intake process 300 continues by automatically applying one or more workflows to the input data values after storing the input data values in the database (task 308). In this regard, the tenant associated with the template used to generate the electronic file may have one or more workflows that are to be applied when new and/or updated data obtained from that electronic file is stored in the database 104. For example, the input data values obtained from a survey response form electronic document may be analyzed or otherwise processed to determine whether a customer service representative should follow up with the contact that completed the survey response form. In response to storing input data values from the survey response form to the database 104, the server 102 and/or the database 104 may automatically obtain the workflows for the tenant that the survey response form is associated with from the workflow table 126, apply the workflows to the input data values in the database object tables 122, and in response to determining that a stored input data value from the completed survey response form satisfies a follow up criterion, the server 102 and/or the database 104 automatically generates a notification or indication for a customer service representative to follow up with the contact associated with the completed survey response form.

It should be noted that in exemplary embodiments, the electronic file from which the input data values are obtained is not stored or otherwise maintained by the database 104. In this regard, after completion of the file intake process 300, any electronic file received by the server 102 may be discarded or otherwise deleted. That said, by virtue of the data input to the electronic file being maintained in the object tables 122 along with the template defining the file format, layout and/or structure for the electronic file being maintained in the database 104, an instance of the completed electronic file may be reconstructed by the server 102 and/or the file management engine 118. For example, if a user belonging to a particular tenant wants to review a survey form completed by a particular contact (or recipient of the survey form), the user may provide identification of that particular contact to the server 102 and/or the file management engine 118 along with a request to generate the survey form for that particular contact. Thereafter, the server 102 and/or the file management engine 118 obtains the template file for the survey form from the database 104 and utilizes the contact identification information to populate the body of the survey form. In this regard, based on the association between the data input fields and the database object fields maintained by the template, the server 102 and/or the file management engine 118 may access the associated database object fields in the object tables 122 to identify the input data values previously provided for those data input fields and populate the data input GUI elements in the electronic document survey form with those input data values stored in the object tables 122.

Figure 4:
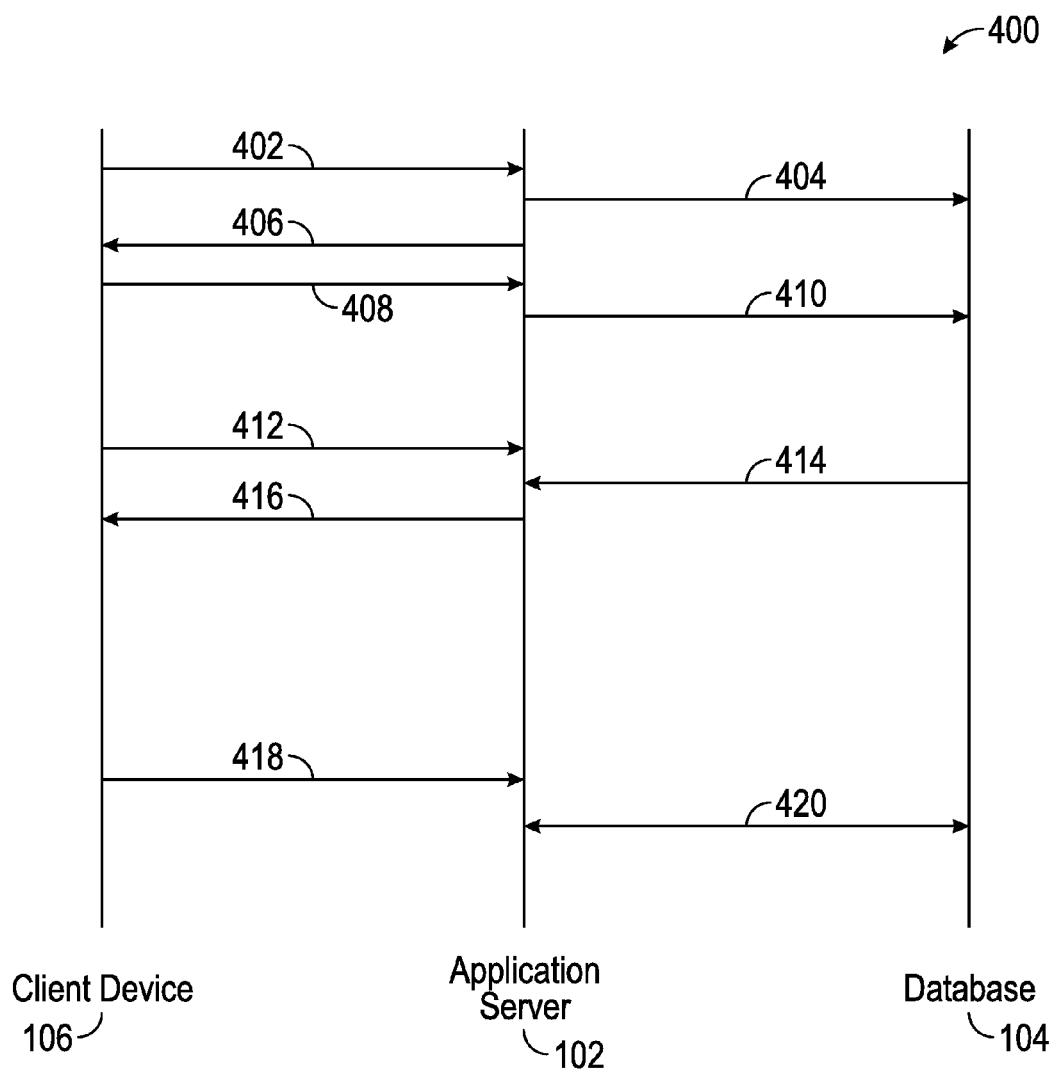
FIG. 4 is a diagram illustrating a sequence of communications within the on-demand application system of FIG. 1 in accordance with one exemplary embodiment of the file generation process of FIG. 2 in conjunction with an exemplary embodiment of the file intake process of FIG. 3.

FIG. 4 depicts an exemplary sequence 400 of communications within the on-demand application system 100 in accordance with an exemplary embodiment of the file generation process 200 of FIG. 2 in conjunction with the file intake process 300 of FIG. 3. Referring to FIG. 4, and with continued reference to FIGS. 1-4, the illustrated sequence 400 begins with the client device 106 contacting the server 102 and initiating creation of a new file template in the database 104. For example, a user of the client device 106 may manipulate GUI elements provided by the virtual application 116 and/or the file management engine 118 within the client application 114 to indicate a desire to create a new template for an electronic document file and provide a name and/or other identification information that the user would like to assign to the new electronic document file. In response to receiving 402 indication of the new template to be created, the server 102 and/or the file management engine 118 interacts 404 with the database 104 to instantiate a new template file in the database 104 and create a new entry (or record) in the template table 124 that points to or otherwise identifies the location of the new template file in the database 104 and maintains its association with the unique identifier for the user's associated tenant, the template name and/or other identifying information provided by the user.

In the illustrated embodiment, after instantiating the new electronic document file template in the database 104, the virtual application 116 and/or the file management engine 118 provides 406 a GUI display on the client device 106 that includes GUI elements for inserting data input fields within the body of the electronic document template. The user of the client device 106 manipulates the GUI elements to insert or otherwise add data input fields within the new electronic document file and identify or otherwise designate the respective database object fields that the data input fields are associated with. In response to receiving 408 indication of a data input field inserted within the electronic document file and its associated database object field, the server 102 and/or the file management engine 118 updates 410 the template file to include information identifying the association between the data input field and its associated database object field. For example, the server 102 and/or the file management engine 118 may automatically generate a marked up reference to a selected field of the object table 122 associated with the particular database object selected by the user and store or otherwise maintain the marked up reference in the template file to associate the selected field of the object table 122 with the inserted data input field. The server 102 and/or the file management engine 118 may continue receiving indication of data input fields being added to the template and updating the template file in the database 104 until receiving an indication that the user is finished defining the template.

After the electronic document file template has been defined, the server 102 may receive 412 indication of a desire to generate a new electronic document file using the template. For example, if the electronic document file corresponds to a survey form, a user may manipulate a client device 106 to request, from the virtual application 116 and/or the file management engine 118, generation of a new survey form for a particular contact of that user and/or the user's tenant. In response to receiving an indication that the electronic document survey form template should be utilized to generate an electronic document file to be sent to an identified contact, the server 102 and/or the file management engine 118 accesses 414 the database 104 to obtain the template file and generate a new instance of the electronic document file.

In the illustrated embodiment, after generating the electronic document file in the appropriate file format, the server 102 and/or the file management engine 118 automatically transmits 416 or otherwise provides the generated electronic document file to a client device 106. For example, in some embodiments, the server 102 and/or the file management engine 118 may transmit or otherwise provide the generated electronic document file to the client device 106 associated with the user that requested the file, while in alternative embodiments, the server 102 and/or the file management engine 118 may transmit or otherwise provide the generated electronic document file to the contact (or intended recipient) identified by the user that requested the file (e.g., by using electronic contact information provided by the requesting user and/or maintained for that contact in the database 104).

After the generated electronic document file has been received by the intended recipient, the user manipulates a client application 114 on the client device 106 that is capable of opening the electronic document file format, and thereafter reviews the electronic document file and manipulates the data entry GUI elements within the electronic document file to input data and/or information into the electronic document file. When the user is done reviewing and modifying the electronic document, the user may cause the electronic document file (or the input data values provided therein) to be transmitted 418 or otherwise provided to the server 102 for submission in the database 104. For example, the user may manipulate a client application 114 to email, transfer, or otherwise upload the electronic document file to the server 102. In other embodiments, the user may manipulate a GUI element within the electronic document file to initiate a web service request to the server 102 and/or the file management engine 118, wherein the client device 106 automatically transmits the input data values from within the electronic document file to the server 102 and/or the file management engine 118 via a web service communications session.

After receiving 418 the electronic document file and/or the input data values contained therein, the server 102 and/or the file management engine 118 translates 420 the input data values to database object fields in the database 104. In this regard, the server 102 and/or the file management engine 118 maps the input data values to their associated database object fields identified by the template for the electronic document file. In one or more embodiments, the server 102 and/or the file management engine 118 parses or otherwise analyzes the electronic document file to identify or otherwise obtain the input data values from the data input fields of the electronic document file, and then for each particular data input field, uses the association between that data input field and a particular database object field identified by the template to translate the input data values to the appropriate fields of the database object tables 122. For example, if the data input field in the electronic document file is associated with a marked up reference to a particular destination field of a database object, the server 102 and/or the file management engine 118 parse the markups to identify the destination field and then store the input data value from that data input field to that designated destination field (or column) in the object table 122 for that designated database object. After translating the input data values to the designated database object fields, the server 102 and/or the file management engine 118 may discard or otherwise delete the received electronic document file from memory 111. In this regard, the completed electronic document file does not need to be separately stored or otherwise maintained by the server 102 and/or the database 104 in the electronic document file format because the template file in the database 104 and the stored input data values in the object tables 122 may be utilized to reconstruct the completed electronic document file.

In accordance with other embodiments, the input data values received by the server 102 and/or the file management engine 118 via a web service request may be accompanied by the reference or otherwise identification of the respective database object fields associated with the respective data input fields from which the respective input data values were captured or otherwise obtained. For each data input value, the server 102 and/or the file management engine 118 utilizes the associated database object field to store the input data value to the appropriate destination field in the appropriate database object table 122. In such embodiments, the completed electronic document file does not need to be separately sent to the server 102 in its entirety, let alone be stored by the server 102 and/or the database 104 in the electronic document file format.

As described above, in some embodiments, prior to storing the input data values in the database 104, the server 102 and/or the database 104 may automatically apply one or more validation rules to ensure the input data values are acceptable values for the particular database object fields they are being mapped to. Additionally, after the input data values are stored in the database 104, the server 102 and/or the database 104 may automatically apply one or more workflows to the stored input data value in the database 104 to initiate one or more additional actions when the stored input data value satisfies one or more triggering criteria for the particular database object field. For example, when a stored input data value satisfies a notification criterion, the server 102 and/or the database 104 may automatically generate a notification or indication that is transmitted or otherwise provided to another user. In this regard, the notification may include information obtained from the submitted electronic document file. For example, the electronic document file may be for a survey response form that includes data input fields associated with the respondent's name and contact information, with the input data values provided in the completed electronic document file that was submitted to the server 102 being stored or otherwise maintained in those fields of the contact database object table 122 for an entry associated with the survey respondent.

When the server 102 and/or the database 104 determines an input data value from another data input field within the completed electronic document file (e.g., an answer to a particular question of the survey) satisfies a notification criterion, the server 102 and/or the database 104 may automatically generate an email or message that includes the survey respondent's name and contact information that were obtained from the completed electronic document file and stored in the contact database object table 122 and automatically transmit or otherwise provide the email or message to a customer service representative.

Figure 5:
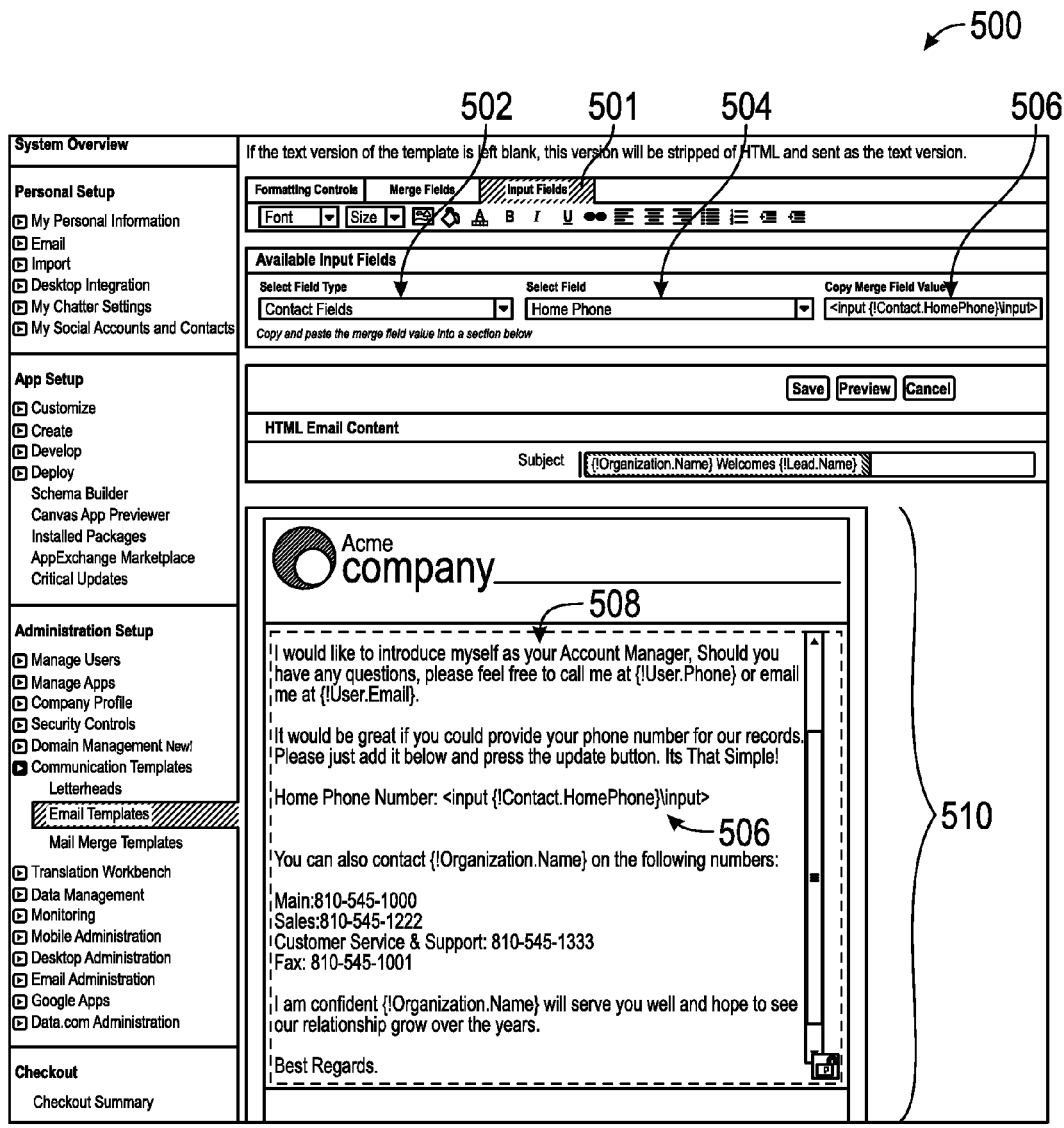
FIG. 5 depicts an exemplary graphical user interface (GUI) display that may be presented on a client device in the on-demand application system of FIG. 1 in conjunction with the file generation process of FIG. 2 to create a template for an electronic document file in accordance with one or more embodiments.

FIG. 5 depicts an exemplary electronic document template editor GUI display 500 that may be presented by the virtual application 116 and/or the file management engine 118 within a client application 114 on a client device 106 to allow a user of the client device 106 to create a template for an electronic document file and define an association between GUI input elements inserted in the document and database object fields within the electronic document file template. The illustrated template editor GUI display 500 includes a document editing region 510 that may be utilized by the user to add content to the body 508 of the document. FIG. 6 depicts a graphical representation of an electronic document file 600 generated based on the electronic document template file defined using the template editor GUI display 500.

Figure 6:
FIG. 6 depicts an exemplary electronic document file that may be generated by the on-demand application system of FIG. 1 using the template created using the GUI display of FIG. 5 in conjunction with the file generation process of FIG. 2 in accordance with one or more embodiments.

Referring to FIGS. 5-6, the illustrated template editor GUI display 500 is realized as a tabbed interface that includes a tab 501 that is selectable by a user to add a data input field to the body 508 of the electronic document template and define an association between that data input field and a desired database object field. When the input field tab 501 is selected, the template editor GUI display 500 includes a first drop-down menu GUI element 502 that may be manipulated by the user to select the particular type of database object that the user would like to associate with an input data value provided via an input GUI element 602 that corresponds to the data input field being added to the document. In this regard, the value of the first drop-down menu 502 identifies which database object table 122 the input data value should be stored in (e.g., the contact object table). Based on the selected object in the first drop-down menu 502, the virtual application 116 and/or the file management engine 118 may populate a second drop-down menu GUI element 504 with a listing of the fields associated with the database object selected in the first drop-down menu 502 (e.g., the various columns of the contact object table). The second drop-down menu 504 is manipulated by the user to select the particular field of the selected database object that the user would like to associate the input data value with (e.g., the particular column of the contact object table). In the illustrated embodiment, the second drop-down menu 504 indicates the input data value should be stored in the home phone number column of the contact object table 122.

In response to the user selecting or otherwise indicating the particular database object and field that should be associated with the data input field being added to the body 508 of the document, the virtual application 116 and/or the file management engine 118 may automatically generate a code segment 506 that provides a marked up reference to the selected field of the selected database object table 122. Thereafter, the code segment 506 is inserted into the body 508 of the document within the editing region 510 at the desired location and stored or otherwise maintained in the electronic document template file in the database 104. As illustrated, additional references to fields in the database object tables 122 may also be added to the body 508 of the document (e.g., "{!Organization.Name}" and the like) for populating those portions of the generated document 600 with data and/or values obtained from those fields of the database object tables 122 in the database 104, as illustrated in FIG. 6.

Referring to FIG. 6, the server 102 and/or the file management engine 118 utilizes the code segment 506 generate the input GUI element 602 corresponding to the data input field and store whatever input data value is provided for that data input field (e.g., via the corresponding input GUI element 602) in the selected field (or column) of that selected database object table 122. For example, in the illustrated embodiment, when the server 102 and/or the file management engine 118 encounters the markup tag for a data input field contained in the code segment 506 while generating the electronic document 600, the server 102 and/or the file management engine 118 determines that an input GUI element 602 should be added at that location in the body 508 of the document 600. In some embodiments, the code segment 506 may include additional markup tags that define the type of GUI element to be utilized, otherwise, the server 102 and/or the file management engine 118 may automatically determine the type of GUI element to be used in the document 600 based on the display criteria associated with the destination database object field referenced by the code segment 506. For example, in the illustrated embodiment, the display criteria associated with the home phone number field of contact objects in the database 104 may indicate that the home phone number field is capable of having a range of possible values that should be captured using a text box 602. In alternative embodiments, if the display criteria indicated that the destination database object field was only capable of having a limited set of values (e.g., only "yes" or "no") that should be captured using a drop-down menu, the server 102 and/or the file management engine 118 may automatically generate a drop-down menu for selecting among that limited set of values within the body 508 of the document.

In one or more exemplary embodiments, the reference to the home phone number field of the contact database object table 122 is embedded or otherwise integrated within the electronic document 600 (e.g., as non-visible markup text) that is associated with the input GUI element 602. In this regard, when the server 102 and/or the file management engine 118 obtains or otherwise identifies an input data value for the data input field via the text box 602, the server 102 and/or the file management engine 118 utilizes the associated marked up reference to the contact home phone number field to store the raw input data value from within the text box 602 in the home phone number field of the contact database object table 122.

In the illustrated embodiment, the body 508 of the document includes a GUI element 604, such as a button, that is selectable by the recipient of the document 600 to submit or otherwise save, to the database 104, data that the recipient has input into the document 600. In some embodiments, the button 604 may be associated with script, code, or the like that cause the client device 106 and/or the client application 114 to generate a web service request to the server 102 and/or the file management engine 118 that initiates a web services communications session. After establishing the web services communications session, the client device 106 and/or the client application 114 may automatically transmit the input data value within the text box 602 to the server 102 and/or the file management engine 118 along with the marked up reference to the contact home phone number field associated with the text box 602. Thereafter, the server 102 and/or the file management engine 118 utilizes the marked up reference to the contact home phone number field associated with the text box 602 to automatically store the raw input data value within the text box 602 to the home phone number field of the contact database object table 122.

In other embodiments, the button 604 may be associated with script, code, or the like that cause the client device 106 and/or the client application 114 to transmit the completed document 600 to the server 102 and/or the file management engine 118. Thereafter, the server 102 and/or the file management engine 118 parses or otherwise analyzes the document 600 to identify the text box 602 corresponding to a data input field and the marked up reference to the contact home phone number field associated with the text box 602. Thereafter, the server 102 and/or the file management engine 118 utilizes the marked up reference to the contact home phone number field associated with the text box 602 to automatically store the raw input data value within the text box 602 to the home phone number field of the contact database object table 122. In embodiments where the reference to the contact home phone number field is not embedded or otherwise integrated into the document 600, upon receipt of the document, the server 102 and/or the file management engine 118 may identify and obtain the electronic document template file maintained in the database 104 that corresponds to the received document 600, and thereafter parse and/or analyze the electronic document template file to identify the data input fields within the document 600 and utilize the association between the data input fields and database object fields maintained by the electronic document template file to store the input data value within the text box 602 in the home phone number field in the contact database object table 122.

Figure 7:
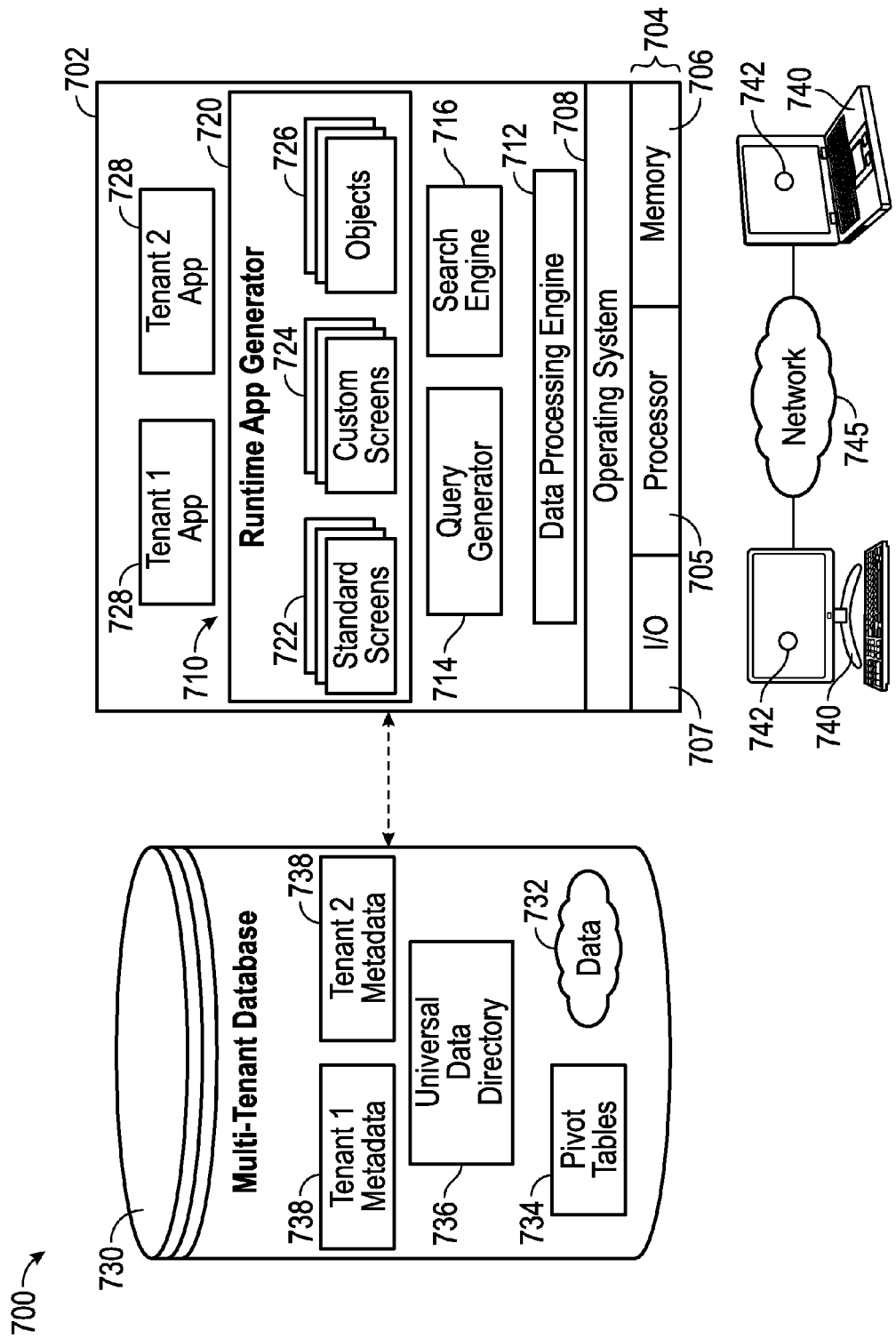
FIG. 7 is a block diagram of an exemplary multi-tenant system suitable for use as the on-demand application system of FIG. 1 in accordance with one or more embodiments.

FIG. 7 depicts an exemplary embodiment of a multi-tenant system 700 suitable for use as the on-demand application system 100 of FIG. 1. The illustrated multi-tenant system 700 of FIG. 7 includes a server 702 (e.g., application server 102) that dynamically creates and supports virtual applications 728 (e.g., virtual application 116) based upon data 732 from a common database 730 (e.g., database 104) that is shared between multiple tenants, alternatively referred to herein as a multi-tenant database. Data and services generated by the virtual applications 728 are provided via a network 745 (e.g., network 108) to any number of client devices 740 (e.g., client device 106, or the like), as desired. Each virtual application 728 is suitably generated at run-time (or on-demand) using a common application platform 710 (e.g., application platform 112) that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of managing files, the method comprising:
   obtaining, by a server from a database, a template corresponding to an electronic document file submitted by a user from a client device via a network, the electronic document file being generated based on the template and the template associating a first data input field of the electronic document file to a first column of an object table in the database corresponding to a first field of an object in the database and a second data input field of the electronic document file to a second column of the object table in the database corresponding to a second field of the object in the database;
   obtaining, by the server, a first raw input data value from the first data input field of the electronic document file and a second raw input data value from the second data input field of the electronic document file;
   in lieu of storing the electronic document file, storing, by the server, the first raw input data value from the data input field of the electronic document in the first column of an entry in the object table in the database and the second raw input data value from the second data input field of the electronic document in the second column of the entry in the object table in the database based on the association between the first and second data input fields of the electronic document file and the first and second fields of the object defined by the template; and
   after storing the first and second raw input data values in the object table:
      generating, by the server, a notification including the second raw input data value from the second column of the entry in the object table in the database when the first raw input data value in the first column of the entry in the object table satisfies a notification criterion defined by a workflow rule; and
      providing, by the server, the notification to another user specified by the workflow rule.

2. The method of claim 1, the template including a markup tag associated with the first data input field, the markup tag including a reference to the first column of the object table, wherein storing the first raw input data value comprises the server storing the first raw input data value in the first column of the object table based on the reference.

3. The method of claim 1, further comprising applying, by the server, one or more validation rules to the first raw input data value prior to storing the first raw input data value, the one or more validation rules including validation criteria for the first field of the object, wherein storing the first raw input data value comprises storing the first raw input data value after determining the first raw input data value satisfies the validation criteria.

4. The method of claim 1, further comprising:
   receiving, by the server, the electronic document file from the client device via the network.

5. The method of claim 4, further comprising obtaining, by the server, the template from the database in response to receiving the electronic document file, the template including a markup tag associated with the first data input field, the markup tag including a reference to the first field of the object, wherein storing the first raw input data value comprises the server storing the first raw input data value from the first data input field in the first field of the object based on the reference within the markup tag.

6. The method of claim 4, further comprising discarding the electronic document file after storing the first raw input data value.

7. The method of claim 1, wherein obtaining the first raw input data value comprises receiving the first raw input data value from the client device via a web service communications session over the network.

8. The method of claim 7, further comprising receiving a marked up reference associated with the first data input field from the client device via the web service communications session, the marked up reference indicating the first field of the object, wherein storing the first raw input data value comprises the server utilizing the marked up reference associated with the first data input field to store the first raw input data value from the first data input field in the first field of the object.

9. The method of claim 1, further comprising:
   generating, by the server, the electronic document file based on the template, the electronic document file having a file format indicated by the template and including a graphical user interface element corresponding to the first data input field; and
   providing, by the server, the electronic document file to the client device via the network.

10. The method of claim 1, further comprising:
receiving, by the server from a second client device via the network, an indication of the first field to be associated with the first data input field;
generating, by the server, a code segment referencing the first column of the object table in the database in response to receiving the indication; and
storing the code segment in the template in the database, wherein storing the first raw input data value comprises the server parsing the code segment to identify the first column of the object table and storing the raw input data value in the first column of the object table.

11. The method of claim 1, wherein:
storing the first raw input data value comprises storing the first raw input data value obtained from the first data input field in the first column of the object table in lieu of storing the electronic document file utilizing a markup tag associated with the first data input field; and
the first raw input data value is unencoded, unformatted, or does not include markup tags.

12. The method of claim 1, wherein generating the notification comprises the server automatically generating a new report or updating an existing report in response to storing the first raw input data value in the first column of the entry in the object table.

13. The method of claim 1, wherein providing the notification comprises the server providing the notification via a web feed in response to storing the first raw input data value in the first column of the entry in the object table.

14. The method of claim 1, wherein generating the notification comprises the server automatically generating an email or message that includes the second raw input data value.

15. The method of claim 14, wherein the second raw input data value comprises a name or contact information associated with the user of the client device.

16. A method of managing files, the method comprising:
generating, by a server, an electronic document file based on a template maintained in a database, the template identifying an association between a first data input field and a first column of an object table corresponding to a first field of an object in the database and a second association between a second data input field and a second column of the object table corresponding to a second field of the object, the electronic file including a first graphical user interface element corresponding to the first data input field and a second graphical user interface element corresponding to the second data input field;
providing, by the server, the electronic document file to a client device via a network, the first graphical user interface element being manipulated via the client device to indicate a first raw input value for the first data input field and the second graphical user interface element being manipulated by a user via the client device to indicate a second raw input value for the second data input field;
obtaining, by the server, the first raw input value indicated by the first graphical user interface element and the second raw input value indicated by the second graphical user interface element;
applying, by the server, one or more validation rules to the first raw input value, the one or more validation rules including validation criteria for the first column of the object table; and
in lieu of storing the electronic document file, after determining the first raw input data value satisfies the validation criteria:
storing, by the server, the first raw input value from the data input field of the electronic document in the first column of an entry in the object table in the database based on the association between the first data input field and the first column of the object table identified by the template and the second raw input value from the second data input field of the electronic document in the second column of the entry in the object table in the database based on the second association between the second data input field and the second column of the object table identified by the template, wherein the entry in the object table corresponds to the object and the first column corresponds to the first field of the object and the second column corresponds to the second field of the object;
applying one or more workflow rules to the first raw input value in the column of the object table after storing the first raw input value, the one or more workflow rules including triggering criteria for the first column of the object table; and
when the first raw input value in the first column of the entry in the object table satisfies the triggering criteria:
generating, by the server, a notification including the second raw input value from the second column of the entry in the object table in the database; and
providing, by the server, the notification to another user specified by the one or more workflow rules.

17. The method of claim 16, the template including a tag associated with the first data input field, the tag comprising a marked up reference to the first column of the object table corresponding to the first field, wherein storing the first raw input value comprises the server storing the first raw input value in the first column of the object table in the database based on the marked up reference.

18. The method of claim 17, wherein:
obtaining the first raw input value comprises the server receiving the first raw input value and the marked up reference via a communications session with the client device over the network; and
storing the first raw input value comprises the server automatically storing the first raw input value in the first column of the object table in the database based on the marked up reference.

19. The method of claim 17, wherein:
obtaining the first raw input value comprises the server:
receiving the electronic document file from the client device via the network after the user of the client device manipulates the first graphical user interface element to indicate the first raw input value for the first data input field; and
parsing the electronic document file to identify the first raw input value indicated by the first graphical user interface element and the tag associated with the first data input field within the electronic document file; and
storing the first raw input value comprises the server automatically storing the first raw input value in the first column of the object table in the database based on the marked up reference in response to identifying the first raw input value and the tag.

20. A system comprising:
a database to store a template for an electronic document file and one or more workflow rules for a column of an object table, the template indicating an association between a first data input field of the electronic document file and the first column of the object table in the database corresponding to a first field of an object in the database and a second association between a second data input field of the electronic document file to a second column of the object table in the database corresponding to a second field of the object in the database; and a server coupled to a network and the database to:
  obtain a first raw input value from the first data input field and a second raw input data value from the second data input field of an instance of the electronic document file from a client device via the network, the instance of the electronic document file being generated based on the template;
  in lieu of storing the instance of the electronic document file, store the first raw input value from the first data input field of the instance of the electronic document file in the first column of an entry in the object table in the database based on the association between the first data input field of the electronic document file and the first column of the object table and store the second raw input value from the second data input field of the instance of the electronic document file in the second column of the entry in the object table in the database based on the second association between the second data input field of the electronic document file and the second column of the object table;
  apply the one or more workflow rules to the first raw input value in the first column of the object table after storing the first raw input value;
  generate a notification including the second raw input value when the first raw input value in the first column of the entry in the object table satisfies a notification criterion defined by the one or more workflow rules; and
  provide the notification to another user specified by the one or more workflow rules.

* * * * *